United States Patent [19]
Raaf

[11] Patent Number: 6,047,070
[45] Date of Patent: Apr. 4, 2000

[54] PROCESS FOR ENSURING A SECURING INTERFACE BETWEEN A TELEPHONE WITH A CARD AND THE NETWORK IN A TELEPHONE SYSTEM

[75] Inventor: Bernhard Raaf, München, Germany

[73] Assignee: Siemens Aktiengesellschaft, Munich, Germany

[21] Appl. No.: 09/043,396

[22] PCT Filed: Sep. 3, 1996

[86] PCT No.: PCT/DE96/01634

§ 371 Date: Mar. 17, 1998

§ 102(e) Date: Mar. 17, 1998

[87] PCT Pub. No.: WO97/11548

PCT Pub. Date: Mar. 27, 1997

[30] Foreign Application Priority Data

Sep. 21, 1995 [DE] Germany ............................ 195 35 128

[51] Int. Cl.[7] .................................................. H04M 1/66
[52] U.S. Cl. .......................... 380/270; 380/258; 380/259; 380/273; 380/43; 455/410; 455/411; 455/435; 455/54.2
[58] Field of Search .................................. 380/258, 259, 380/270, 43; 455/410, 411, 435, 54.2

[56] References Cited

U.S. PATENT DOCUMENTS

| | | | |
|---|---|---|---|
| 4,759,056 | 7/1988 | Akiyama | 379/197 |
| 5,444,764 | 8/1995 | Galecki | 379/58 |
| 5,633,914 | 5/1997 | Rosa | 379/59 |
| 5,657,373 | 8/1997 | Hermansson | 455/435 |
| 5,913,175 | 6/1999 | Pinault | 455/558 |
| 5,933,785 | 8/1999 | Tayloe | 455/558 |
| 5,943,615 | 8/1999 | Rose et al. | 455/411 |
| 5,956,633 | 9/1999 | Janhila | 455/410 |
| 5,956,653 | 9/1999 | Lahti | 455/558 |
| 5,987,325 | 11/1999 | Tayloe | 455/435 |
| 5,991,407 | 11/1999 | Murto | 380/23 |
| 5,999,811 | 12/1999 | Molne | 455/432 |
| 6,002,929 | 12/1999 | Bishop, Jr. et al. | 455/431 |

FOREIGN PATENT DOCUMENTS

| | | |
|---|---|---|
| 0 502 446 A2 | 9/1992 | European Pat. Off. . |
| 0 635 964 A1 | 1/1995 | European Pat. Off. . |
| 39 30 869 A1 | 3/1991 | Germany . |
| 42 42 151 C1 | 3/1994 | Germany . |
| 44 06 602 A1 | 9/1995 | Germany . |
| 2 211 050 | 6/1989 | United Kingdom . |

OTHER PUBLICATIONS

Proceedings of International Computer Symposium (1994), XP 000577607, Y. Zheng, Enhancing Security in GSM, pp. 297–302.

*Primary Examiner*—Tod R. Swann
*Assistant Examiner*—Paul E. Callahan
*Attorney, Agent, or Firm*—Hill & Simpson

[57] ABSTRACT

In the method for dialing only preprogrammed telephone numbers, it is provided that when there is a desire for access or connection, the telephone number is transmitted from the telephone to the card, which checks a possible enabling of the number and, in the event of a positive result, uses a secret algorithm to produce a signature from this number and a varying code which is predetermined by the network. This signature is transmitted together with the number to the network, by which the enabling of the dialed number by the card is determined by checking the signature.

5 Claims, 3 Drawing Sheets

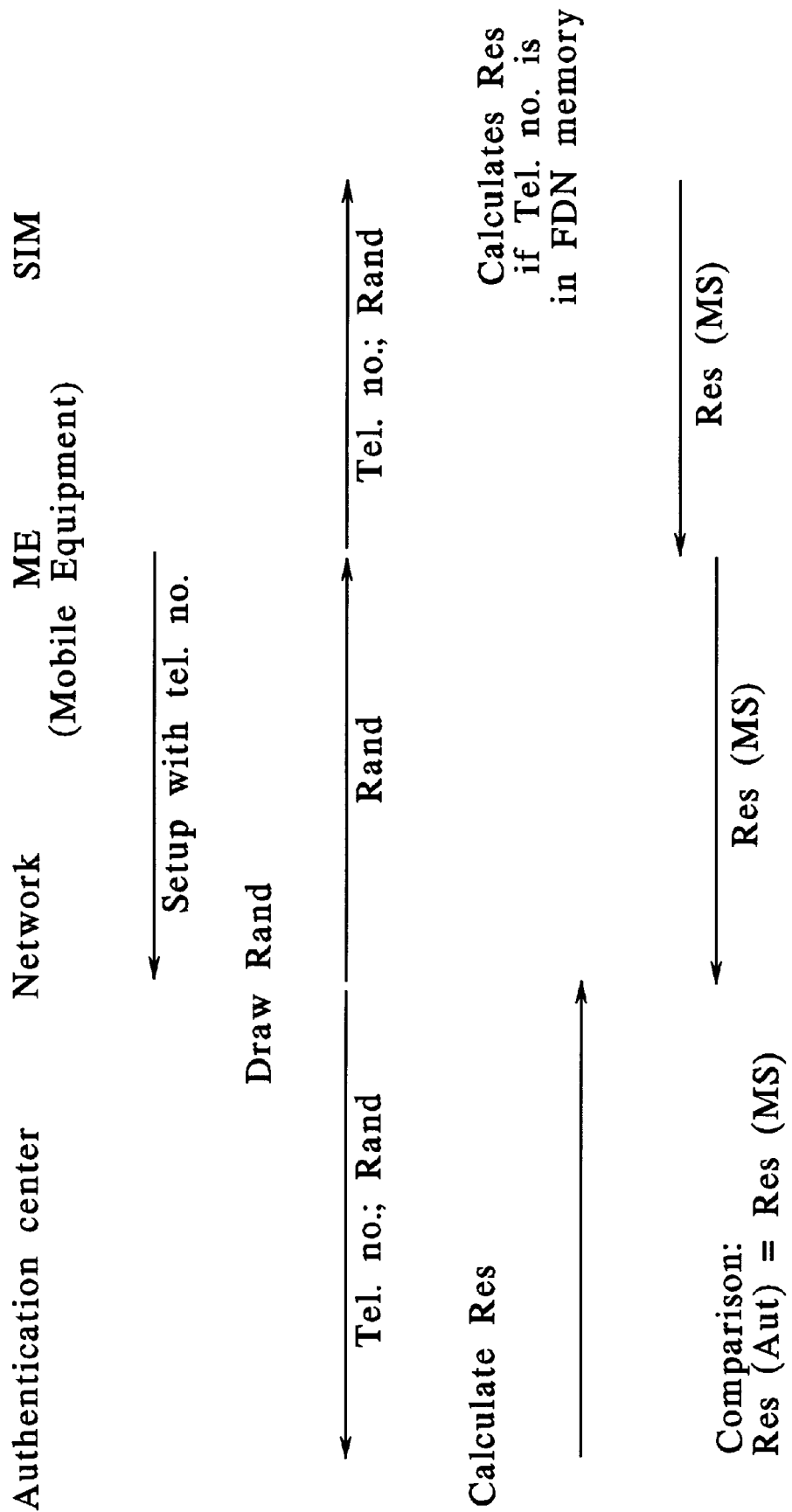

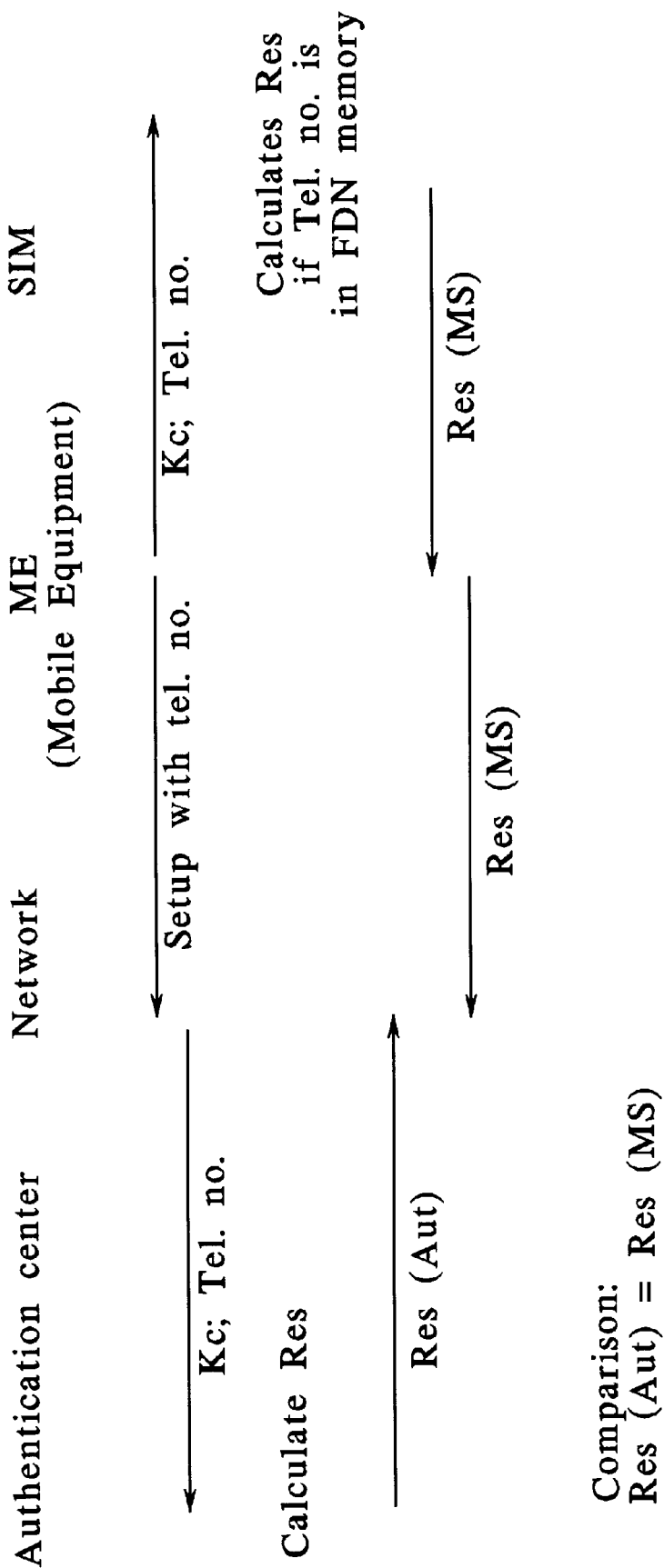

PROCESS FOR ENSURING A SECURING INTERFACE BETWEEN A TELEPHONE WITH A CARD AND THE NETWORK IN A TELEPHONE SYSTEM

BACKGROUND OF THE INVENTION

The invention relates to a method for a reliable interface between a telephone having a card with subscriber identity and the network when dialing specific preprogrammed telephone numbers in a telephone system. In this way, the user of a telephone is to be allowed only to dial specific preprogrammed telephone numbers.

In the GSM (Group Special Mobile) mobile radio system, this feature is designated by FDN (Fixed Dialing Number). The permitted numbers and the fact of whether the restriction is switched on or off is stored on a smart card. If the feature "restriction" is switched on, the telephone carries out a check when a number is entered to see whether the latter is enabled, and carries out a call setup in the event of a positive result. However, there is the problem here that the interface between the card and the telephone is freely accessible, in other words the presence of any desired number in the list of permitted numbers can very easily be simulated by intercepting the relevant commands, for example.

SUMMARY OF THE INVENTION

The invention is based on the object of specifying a simple method for a reliable interface between a telephone having a card and the network for dialing only preprogrammed telephone numbers.

This object is achieved according to the invention in that when there is a desire for access or connection, the telephone number is transmitted from the telephone to the card, which checks a possible enabling of the number and, in the event of a positive result, uses a secret algorithm to produce a signature from this number and a varying code which is predetermined by the network, and in that the signature is transmitted together with the number to the network and the enabling of the dialed number by the card is determined by the network by checking the signature.

In general terms the present invention is a method for a reliable interface between a telephone having a card with subscriber identity and a network. Specific preprogrammed telephone numbers are stored on the card and, when there is a desire for access or connection, the dialed telephone number is transmitted from the telephone to the card, which checks a possible enabling of the telephone number.

In the event of a positive result of the check, a secret algorithm is used to produce a signature from this telephone number and a varying code which is predetermined by the network or by an authentication center. The signature is transmitted together with the telephone number to the network. The enabling of the dialed telephone number by the card is determined by the network by checking the signature.

Advantageous developments of the present invention are as follows.

When there is a desire for access or connection, a setup with the telephone number is performed by the subscriber equipment. A random number is drawn in the network and both are transmitted to the authentication center, in which a result is calculated. The random number drawn by the network is simultaneously transmitted to the subscriber equipment and is transmitted, together with the telephone number, to the card. A result is calculated if the telephone number is a specific preprogrammed telephone number. The result of the card is subsequently compared with the result of the authentication center in the network.

If a key from a preceding authentication is known to the card and to an authentication center, this key is used instead of a random number to calculate the result. The telephone number is contained in the fixed dialing number memory, and the telephone number is transmitted from the subscriber equipment to the network and, from the latter, is transmitted together with the key to the authentication center, in which a result of the center is calculated and is compared with the result of the card.

Together with the dialed telephone number, the location number of this telephone number is also transmitted to the card together with the random number or the previously exchanged key. The card calculates the result only when the transmitted telephone number at the likewise transmitted location number is enabled.

The configuration according to the invention precludes any manipulation in the telephone or at the interface with the card. Nevertheless, the list of permitted numbers does not need to be administered in the network. The additional expenditure for realizing this design is low, since the smart cards used have usually already implemented authentication algorithms and search routines and parallel algorithms for authentication are also used at the network end and at the card end. If no search algorithm is to be implemented in the card, the telephone can also communicate the location number of the telephone number to the card; the card then only has to carry out a comparison.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 depicts a flow diagram of another embodiment of the method of the present invention;

FIG. 3 depicts a flow diagram of a further embodiment of the method of the present invention.

DESCRIPTION OF THE PREFERRED EMBODIMENTS

Figure 1:
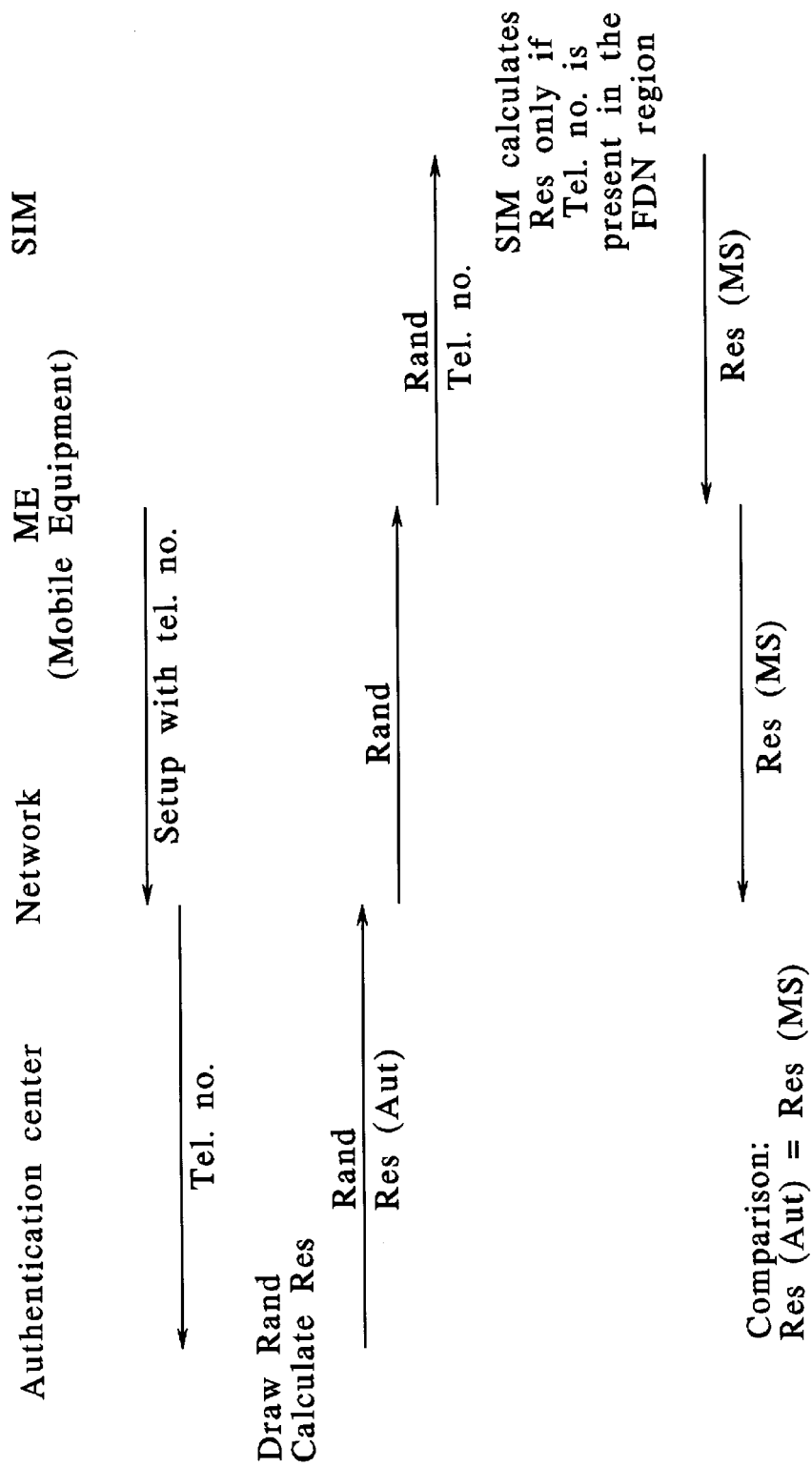
FIG. 1 depicts a flow diagram of the method of the present invention.

FIG. 1 shows a flow diagram of the method sequence for validating telephone numbers permitted by preprogramming. The mobile equipment ME (Mobile Equipment) effects the setup with the telephone number to the network, from which the telephone number is forwarded to the authentication center Aut. In the latter, a random number Rand is drawn from which, together with the telephone number, a result Res is calculated. Rand and Res (Aut) are transmitted to the network and the latter forwards the random number Rand to the mobile equipment. Rand and the telephone number are transmitted from the mobile equipment to the card SIM (Subscriber Identify Module). The card calculates a result Res only when the telephone number is in the FDN range. In the event of a positive result, the result Res (MS) is forwarded to the mobile equipment ME and from there to the network, where a comparison with the result of the authentication center Res (Aut) is carried out. The algorithm in this case calculates the result Res, also called response or signature, from the random number Rand and the telephone number and possibly from an additional card-dependent code. Algorithm and code are known only to the card and the authentication center.

FIG. 2 shows an embodiment with a message flow geared to speed. In this case, a setup with the telephone number is likewise effected from the mobile equipment ME to the network, but a random number Rand is already drawn in the network and is transmitted together with the telephone number to the authentication center. The random number Rand is simultaneously transmitted to the mobile equipment and, from the latter, is transmitted together with the telephone number to the card SIM. A result Res is calculated here if the telephone number is contained in the FDN memory. In the event of a positive result, the result Res (MS) of the card is transmitted via the mobile equipment to the network and is compared in the latter with the result Res (Aut) calculated in the authentication center.

FIG. 3 shows an embodiment in which, rather than a random number Rand, use is made of a key, for example Kc from a preceding authentication, which key is known to both ends, that is to say the card and the authentication center. From the mobile equipment ME, a setup with the telephone number is effected, on the one hand, to the network, from which the key and the telephone number are transmitted to the authentication center, and, on the other hand, a transmission of the key and the telephone number to the card SIM. A result Res is calculated in the authentication center, likewise a result Res in the card, if the telephone number is contained in the FDN memory. The two results, namely Res (Aut) and Res (MS) are then compared with one another in the network.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for interfacing a telephone, having a card with subscriber identity, and a network, specific preprogrammed telephone numbers being stored on the card and, when there is a desire for access or connection, a dialed telephone number is transmitted from a telephone to the card, which checks for a possible enabling of the telephone number comprising the steps of:

using, for a positive result of the check, a secret algorithm to produce a signature from said telephone number and a varying code which is predetermined by one of the network or an authentication center, and transmitting the signature together with the telephone number to the network; and determining enabling of the dialed telephone number by the card using said network that checks the signature.

2. The method according to claim 1, wherein for a call access or connection, a setup with the telephone number is performed by subscriber equipment, wherein a random number is drawn in the network and the telephone number and the random number are transmitted to the authentication center, in which a result is calculated, and wherein the random number drawn by the network is simultaneously transmitted to the subscriber equipment and is transmitted, together with the telephone number, to the card, in which a result is calculated if the telephone number is a specific preprogrammed telephone number, and wherein the result of the card is subsequently compared with the result of the authentication center in the network.

3. The method according to claim 2, wherein if a key from a preceding authentication is known to the card and to an authentication center, this key is used to calculate the result of the card, and wherein the telephone number is stored in a fixed dialing number memory, and the telephone number is transmitted from the subscriber equipment to the network and, from the network, is transmitted together with the key to the authentication center, in which a result of the authentication center is calculated and is compared with the result of the card.

4. The method according to claim 2, wherein, together with the dialed telephone number, a location number of the telephone number is also transmitted to the card together with the random number, and wherein the card calculates the result only when the transmitted telephone number is enabled for the transmitted location number.

5. A method according to claim 3, wherein, together with the dialed telephone number, a location number of the telephone number is also transmitted to the card together with the previously exchanged key, and wherein the card calculates the result only when the transmitted telephone number is enabled for the transmitted location number.

* * * * *